Oct. 29, 1963    D. L. TAYLOR    3,108,641
HELICOPTER CONTROL SYSTEM
Filed March 16, 1961
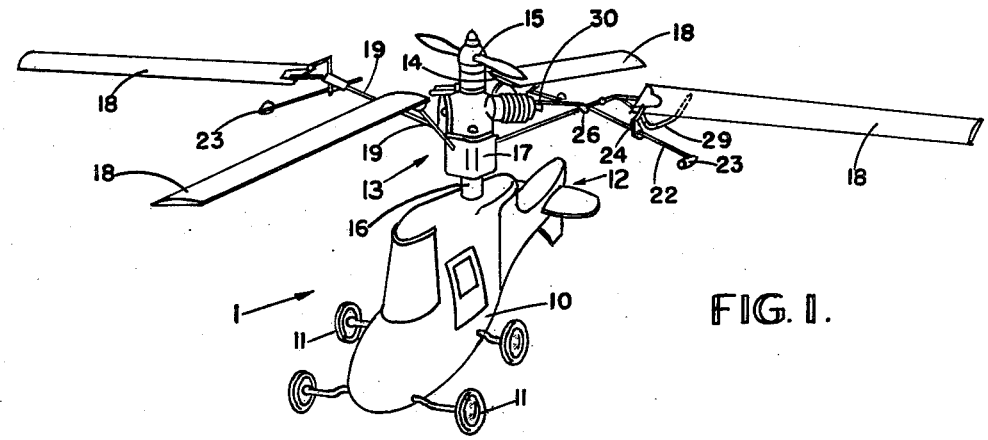
FIG. 1.
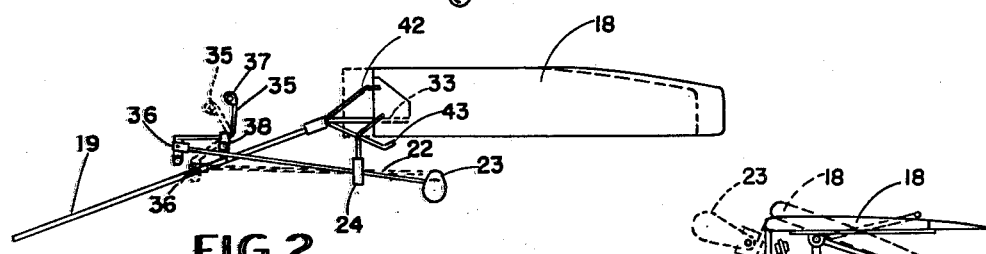
FIG. 2.
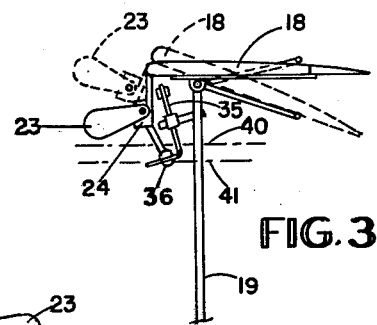
FIG. 3.
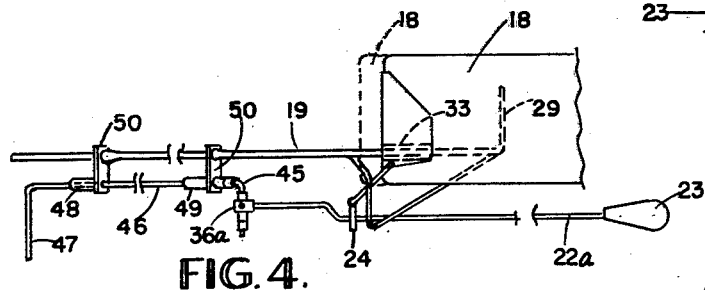
FIG. 4.
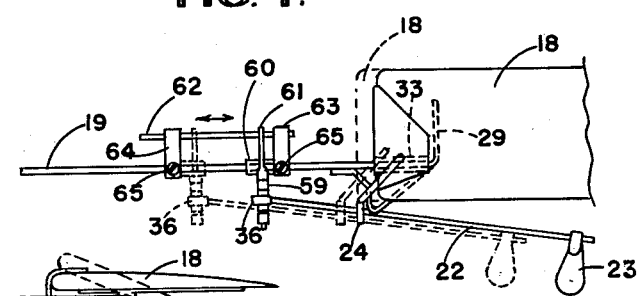
FIG. 6.
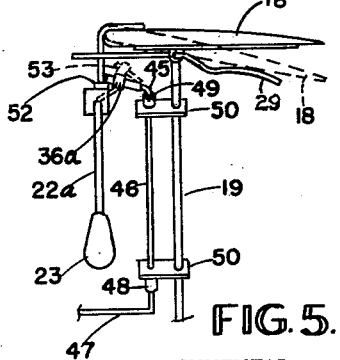
FIG. 5.
FIG. 7.
INVENTOR.
D. LEE TAYLOR
BY
ATTORNEYS United States Patent Office
3,108,641
Patented Oct. 29, 1963

1

3,108,641
HELICOPTER CONTROL SYSTEM
Dana Lee Taylor, 1444 Carr St., Lakewood, Colo.
Filed Mar. 16, 1961, Ser. No. 96,306
3 Claims. (Cl. 170—160.16)

This invention relates to helicopters, and more particularly to centrifugally actuated, rotor pitch control systems for flying models of helicopters.

Many different types of flying models of aircraft have been proposed and actually have demonstrated their ability to fly. In the many types of such aircraft, the lack of a flying model helicopter is notable. While several have been proposed the actual operation of model helicopters is very difficult and the problems encountered generally are beyond the scope of amateur model makers.

In one embodiment of the invention there is provided a simple, centrifugally actuated control system for changing the pitch of the helicopter rotor, which changes the pitch of the helicopter rotors in accordance with the rate of rotation of such rotors, provides stability for the helicopter by automatically increasing the pitch of a rotor when the helicopter is tilted toward that side and decreases the pitch of the rotors on the opposite side so as to automatically right the helicopter. In another embodiment means are provided for remote control or for automatic control of the rotors for making the helicopter rise or descend in a predetermined pattern. For example, by using my system a radio controlled helicopter is provided, and rotor pitch is changed by radio signals from the ground. Also, a self-contained timing device may be utilized for changing the pitch of the rotors on a predetermined schedule to initate a predetermined flight pattern.

It is, therefore, among the objects and advantages of the present invention to provide a model helicopter having simple, centrifugally actuated control mechanism for changing or adjusting rotor pitch which provides an automatic stabilizing system for such model helicopters, and it provides means for a simplified system for controlling the flight of such helicopters. A weight system for the rotors of a model helicopter is utilized which centrifugally operates to change rotor pitch and thereby control the flight characteristics of the helicopter. A simplified, inexpensive control system is provided for insuring correct flying characteristics of a helicopter and for controlling the operation of such a helicopter.

These and other objects and advantages of the invention may be readily ascertained by referring to the appended illustrations in which:

FIG. 1 is a perspective view of a helicopter utilizing my invention;

FIG. 2 is a detailed, top plan view of a rotor using one modification of a control system according to the invention;

FIG. 3 is an end view of the device of FIG. 2 showing the position changes of control system for rotor pitch;

FIG. 4 is a top plan view of a modified form of control system for rotor pitch;

FIG. 5 is an end view of the device of FIG. 4;

FIG. 6 is a top plan view of another modified rotor pitch control system according to the invention; and FIG. 7 is an end view of the device of FIG. 6.

In the device shown in FIG. 1 the helicopter, generally shown by numeral 1, includes a body portion 10 including wheels 11, an empennage system shown in general at 12, and a motor and rotor assembly shown by numeral 13. The engine assembly includes a cylinder 14 and a propeller system 15 on a shaft mounted thereabove. The engine and rotor assembly 13 is freely rotatably mounted on a shaft 16 secured to the upper portion of the fuselage

2

10. The engine is provided with a fuel supply tank 17 which is mounted on and rotates with the engine. An internal feed line supplies fuel to a needle valve (not shown). A series of four rotor blades 18 are pivotally mounted on rotor arm supports 19 which are connected to the fuel cell 17. Each rotor blade 18 is mounted on its arm 19 by a pivotal connection and a stop bow 29 is provided for predetermining the maximum and minimum range of rotor pitch, as explained below. Each rotor arm has attached thereto a pivotally attached weight support arm 22 which extends outwardly. At the end of the support arm 22 is mounted a weight member 23. A link 24 is journalled on the arm 22 and is interconnected between the support arm 22 and the rotor blade 18.

In its simplest form, the weight control system is pivotally attached by means of its support arm to the rotor arm at a fixed pivot point 26, and the arm 22 is so mounted as to slope downwardly when the helicopter is in horizontal position. In this position, the link arm 24 pulls the rotor blade 18 to about a zero angle or a negative angle of attack. The front of the stop 29 provides a limit for downward tilt of the leading edge of the blade and thereby determines the minimum angle of attack of the blade. The rear part of stop 29 limits tilting movement of the trailing edge of the rotor blade and thereby determines maximum angle of attack. Since the arm 22 is pivotally attached at 26, it is free to move upwardly and downwardly carrying the link 24 which in turn pivots the blade. The stop, through the rotor and link 24, limits movement of the arm 22. It is to be noted that each rotor blade is similarly arranged.

In operation, a battery is attached to the engine glow plug 30 and cylinder, by proper leads, and the gas control needle valve (not shown) is adjusted for starting. Such needle valves are well known in the art of model aircraft engines. The engine is started by rapidly turning the propeller 15 and, after starting, the needle valve is adjusted for optimum operation. The battery is then withdrawn and the engine operates under its own power. The propeller 15 rotates rapidly and torque counter to the propeller rotation, rotates the engine itself carrying the rotor blades 18. When the propeller rotates clockwise, the rotors rotate counterclockwise.

In resting or neutral position, the weights hold the arms 22 in lowermost position, thereby holding the rotor blades 18 at minimum angle of attack. As the rotor rotates the weights rise due to centrifugal force tending to approach a horizontal plane with the pivot point, and as they rise they push the link 24 upwardly, thereby increasing the angle of attack of the blades 18. As the angle of attack 18 increases, the lift of the rotor blades increases and at the point where the lift is greater than the weight of the helicopter, it rises. Each weight is arranged to move upwardly to a substantially horizontal position in relation to the pivot point, at which point the rotor blades 18 are at substantially the maximum angle of attack desired for the particular operation. This angle of attack must be less than that permitted by the stop 29, as explained below.

During the flying of the helicopter the weights provide an automatic control for stabilizing it. For example, if a gust of wind strikes the helicopter in such a manner as to tilt it, as the blades pass through the lower part of the tilt they tend to increase their pitch due to the fact that the weight tends to rise, due to the fact that the weight tends to stay in the same plane causing an apparent increase in height of the weight pivot point in relation to its normal horizontal position. In a like manner, on the high side of the tilt centrifugal force on the weight tends to maintain it in its horizontal plane. The tilt of the helicopter tends to raise the weight, and the weight counteracting such force tends to remain in its normal horizontal plane of rotation, thereby pulling down on the link arm, tending to decrease the angle of attack of the rotors on the high side. Thus, when the low side of the tilt has increased lift and the upper side has decreased lift, the helicopter rights itself. This stabilizing effect is, obviously, automatically applicable for side as well as forward and backward tilting.

When different flight characteristics are desired of the helicopter, the support arms 22 may be bent upwardly or downwardly to change the relation of the weight to its pivot point. For example, if increased lift is desired, the wire should be bent so that the weight is moved downwardly, which increases the actual movement of the weight toward a horizontal position, thereby increasing the angle of attack of the rotor blades and providing increased lift. In the same manner, if decreased lift is desired, the wire support arm 22 should be bent to move the weight upwardly, which decreases the movement of the arm and decreases the maximum angle of attack of the rotor blades. In any event, however, it should be noted that the maximum angle of attack to which the rotor blade can move should be greater than the movement actuated by the weight by centrifugal force so that the weights provided with the automatic control on tilting. Obviously, if the blade is at its maximum angle of attack, i.e., limited by the stop means from the further movement, tilting of the helicopter will not permit movement of the rotor on the high side. Thus, the range of control of the angle of attack of the rotor blade should lie between the minimum and the maximum angle of attack.

If the engine quits for any reason, as for example running out of gas, the rotor blades slow down and the weights naturally drop since centrifugal force on the weights is reduced. The weights, therefore, tend to assume their normal resting position. As the rotors slow down and the weights drop, the angle of attack of the rotor blades decreases and at a lower rotation, the pitch of the rotors is changed to a negative pitch and the rotors auto-rotate for a slow and smooth return to earth. Since the blades will auto-rotate, the weights hold the blades in negative pitch, as the rate of rotation, without power, cannot be great enough to move the weight upwardly and the helicopter floats slowly to the earth. The rate of descent is normally as slow as a parachute of sufficient size to support the weight as represented by the helicopter.

As pointed out above, control of the rotors may be manually accomplished by changing the position of the weight in relation to its pivot point by bending the weight supporting arm and thereby changing the movement of the rotor blade through various angles of attack. The movement of the weight may, also, be controlled by changing the pivot point, as for example moving it upwardly or downwardly and thereby changing the actual pivotal movement of the weight itself. Thus, by moving the pivot point upwardly, on rotary movement the weight will move toward a horizontal plane which is higher than previously, and the link between the rotor and the support arm is moved to a higher position, thereby moving the rotor blade to a greater positive angle of attack. One method of varying the position of the pivot point is shown in FIGS. 2 and 3 wherein a centrally pivoted lever arm 35 is pivotally mounted on a pivot support member 38 and the weight support arm 22 is mounted by means of a clevis 36 on one side of the lever arm 35. The lever arm 35 is provided with an eye 37 to which may be attached a cable, push-pull rod, or the like which, in turn, is attached to a control mechanism internally of the aircraft or mounted on the motor itself. Such a mechanism may be a radio-controlled system or it may be a mechanical timer system mounted with a cam or the like so as to move the cable toward and away from the helicopter and thereby move the lever arm from the positions shown in the solid to the dashed lines. Movement of the lever arm obviously moves the position of the pivot point 36 from an upper to a lower position. Such upper and lower position is shown in FIG. 3 where the upper position is shown by line 40 which permits the weight to move to an upper position, as shown in the dashed lines 23, which in turn moves the rotor blade to an increased positive pitch, as shown by the dashed lines 18. In a similar manner, by moving the pivot point to its lower position 41, as shown in the solid lines for pivot point 36, the weight may only move to its position shown in the solid lines 23, maintaining the rotor 18 in its lower position shown in the solid lines 18.

With a device according to FIGS. 2 and 3, and utilizing a radio-controlled solenoid member, a cable or rod interconnected between the solenoid and the eyelet 37 of the lever arm 35 may be utilized to move the lever arm and thereby raise or lower the pivot point 36 and thereby control the angle of attack of the rotor even at operating r.p.m. of the engine. Thus, the helicopter may be controlled while in flight. Similarly, by using a timer device having a rotating cam, a lever may be made to move the arm 35 on a predetermined schedule (by the cam) and thereby provide a predetermined flight characteristic of the helicopter.

FIGS. 4 and 5 illustrate a modified version of the means for changing the position of the pivot point 36a of the weight support arm 22a which supports a weight 23. The rotor 18 is pivotally mounted on its support arm 19 and a stop means 29 is arranged to limit maximum and minimum pivotal movement of the rotor blade 18. The rotor blade is reciprocably mounted on the arm 19, and is arranged to move from an inboard to an outboard position. A link member 24 is interconnected with the blade 18 and the weight support arm 22 so as to provide movement of the blade on pivotal movement of the arm 22. The pivot point 36a is mounted on arm member 45 which is a right angle extension of a crank arm 46. The opposite end of the crank arm is provided with a right angle extension member 47. The shaft 46 is journalled in sleeves 48 and 49 which are secured to cross links 50 which are mounted on the rotor support arm 19.

As shown in FIG. 5, pivotal movement of the arm 47 rotates the shaft 46 and turns the arm 45 through an angle and thereby raises or lowers the pivot point 36a.

In one position the arm 47 is turned so that the pivot point 36a is in a plane shown by line 52. In this position the pivot point supports the arm 22a at a lower position so that the blade 18 is at substantially a zero angle of attack, as shown in the solid lines. On rotation of the arm 47 upwardly the pivot point 36a moves to an upper position 53, which permits the arm 22a to rise higher on centrifugal movement of the rotors to move the wing to a positive angle of attack, as shown by the dashed lines 18. The movement of the lever arm 47 may be controlled by either a radio-controlled apparatus or by a mechanical timer device which is arranged to move the arm upwardly and downwardly and thereby change the pivot point of the weight support arm.

Another modified form of a means for moving the pivot point of the weight support arm 22 is illustrated in FIGS. 6 and 7 wherein a rotor blade 18 is pivotally mounted by a sleeve 33 on the outer end of a rotor support arm 19 for inboard and outboard positions of the blade as it is moved inwardly and outwardly by the arcuate path of the connector 24 due to the pivotal movement of the weight arm 22. Also, centrifugal force tends to pull the blade to outboard position on rotation of the rotors. A stop mechanism 29 is arranged to limit maximum and minimum pivotal movement of the rotor blade 18. The link 24 interconnects the weight support arm 22 and the rotor so that movement of the weight arm pivotally moves the rotor. The pivot clevis 36 of the weight support arm 22 is mounted on a shaft member 59 which is mounted on a sleeve 60 reciprocally mounted on the rotor arm 19. A link bar 61 with a bifurcated end 66 is interconnected with a control rod 62. Upper stop means 63 and lower stop means 64 are releasably secured to the arm 19 by means of set screw members 65 to limit upper and lower movement of the pivot clevis 36, as illustrated in the solid and dashed lines. Note that the arm 19 extends outwardly from the engine at an upwardly inclined angle and movement of the pivot clevis therealong moves it from a lower to an upper position. As shown in FIG. 7, movement of the sleeve member 60 from the lower stop to the upper stop moves the rotor blade from the solid to the dashed position, or from substantially zero to a positive angle of attack. Movement of the arm 59 up and down the rotor arm 19 can be accomplished by means similar to that described above where a push-pull rod may be attached to the arm for moving it up and down by its sleeve between the upper and lower stops. Also, a cable attached to the arm may be controlled to pull the arm toward the engine, and on release centrifugal force will move it toward outermost position. This provides a means for controlling the flight of the helicopter.

Various other simplified means may be provided for changing the position of the pivot point and thereby controlling the pitch movement of the rotors controlling the flight of the helicopter.

While certain embodiments of this improved device have been shown and described to illustrate the broad aspects of this invention, it will be understood that various modifications and changes may be made therein, as indicated to those skilled in the art, without departing from the spirit of this invention.

I claim:
1. A flight control for model helicopters having a flight sustaining rotor assembly including a plurality of rotor blades extending laterally of a main rotor shaft and each rotor blade being pivotally mounted on a single support arm providing a pivot movement of each rotor blade for changing the pitch thereof, comprising a weight support arm pivotally secured to each said rotor arm, a separate independent weight mounted on each said arm and arranged to move from an effective position below the horizontal plane through its pivotal connection with said rotor arm to a position above said horizontal plane, means interconnecting each said support arm with the adjacent rotor blade whereby movement of the support arm pivots said rotor blade and changes its pitch, said weight support arms being pivoted for movement axially of the main rotor shaft, and means arranged to vary the effective distance through which said weights move under the influence of centrifugal force in relation to the horizontal plane through the pivot connection of each said support arm.

2. A flight control according to claim 1 in which each weight support arm is bendable for varying the effective vertical distance between the weight means and its pivot.

3. A flight control device according to claim 1 wherein rotor blade stops are arranged on each rotor blade support arm for controlling the maximum and minimum pitch movement of the rotor blades which maximum and minimum angle is greater than the normal movement of said weight means in the horizontal position of the helicopter.

References Cited in the file of this patent

UNITED STATES PATENTS

| | | |
|---|---|---|
| Re. 18,957 | Gobereau | Sept. 26, 1933 |
| 860,447 | Cook | July 16, 1907 |
| 1,350,312 | Hubbard | Aug. 24, 1920 |
| 2,489,343 | Wassermann | Nov. 29, 1949 |
| 2,620,592 | Goedecker et al. | Dec. 9, 1952 |
| 2,827,968 | Sissingh et al. | Mar. 25, 1958 |
| 2,931,132 | Griessl | Apr. 5, 1960 |
| 2,934,151 | Jenney | Apr. 26, 1960 |
| 2,940,526 | Vongerichten | June 14, 1960 |
| 2,971,584 | Schon | Feb. 14, 1961 |

FOREIGN PATENTS

| | | |
|---|---|---|
| 236,749 | Germany | July 11, 1911 |
| 294,859 | Italy | Apr. 6, 1932 |
| 512,363 | Italy | Jan. 31, 1955 |
| 751,837 | Great Britain | July 4, 1956 |
| 1,168,842 | France | Sept. 1, 1958 |